United States Patent [19]

Elsbett et al.

[11] Patent Number: 5,067,452
[45] Date of Patent: Nov. 26, 1991

[54] CYLINDER HEAD AND CYLINDER HEAD COVER FOR INTERNAL COMBUSTION ENGINES

[76] Inventors: Ludwig Elsbett; Günter Elsbett; Klaus Elsbett, all of Industriestrasse 14-16, D-8543 Hilpoltstein, Fed. Rep. of Germany

[21] Appl. No.: 547,767

[22] Filed: Jul. 2, 1990

[30] Foreign Application Priority Data

Jun. 30, 1989 [DE] Fed. Rep. of Germany ....... 3921662

[51] Int. Cl.⁵ ............................................ F02M 35/00
[52] U.S. Cl. ......................... 123/193 H; 123/188 M; 123/193 CH
[58] Field of Search ....... 123/193 H, 193 CH, 188 M, 123/559.1, 306, 315

[56] References Cited

U.S. PATENT DOCUMENTS 3,861,375  1/1975  Excoffon ..................... 123/188 M
4,484,549 11/1984  Yokoyama ................... 123/188 M
4,873,953 10/1989  Muranaka et al. ........... 123/188 M
4,877,004 10/1989  Nishizawa .................... 123/188 M Primary Examiner—Andrew M. Dolinar
Assistant Examiner—M. Macy
Attorney, Agent, or Firm—Peter K. Kontler

[57] ABSTRACT

The cylinder head in a compression-ignition engine with at least three cylinders has a single opening for admission of fuel charge, a single opening for exhaust gases, a first set of channels which connect the fuel charge admitting opening with the inlet valves for discrete cylinders, and a second set of channels which connect the opening for exhaust gases with the exhaust valves for discrete cylinders. This renders it possible to dispense with intake and exhaust manifolds. The cover for the cylinder head contains a cooler for fuel charge and/or a turbocharger. The inlet of the turbocharger is directly connected to the opening for exhaust gases and the outlet pipe of the turbocharger for fuel charge is directly connected to the fuel charge admitting opening. The cooler can be installed in the outlet pipe of the turbocharger.

10 Claims, 1 Drawing Sheet

5,067,452

CYLINDER HEAD AND CYLINDER HEAD COVER FOR INTERNAL COMBUSTION ENGINES

BACKGROUND OF THE INVENTION

The invention relates to internal combustion engines in general, especially to compression-ignition engines, and more particularly to improvements in those parts of engines which serve to supply a fuel charge to and to evacuate exhaust gases from the combustion chambers of an engine having three or more cylinders. Still more particularly, the invention relates to improvements in cylinder heads and cylinder head covers for use in engines of the above outlined character.

German Pat. No. 2,556,662 discloses a four-cylinder internal combustion engine wherein the cylinder head has a single opening for exhaust gases and is provided with passages connecting the single opening with the combustion chambers for all four cylinders. A drawback of the patented engine is that it must employ an inlet manifold with pipes serving to supply fuel charges to the inlet valves for the four cylinders.

German Pat. No. 744,040 discloses an internal combustion engine with a suction chamber which is provided in and is adjacent a longitudinally extending wall of a cover. The chamber has discrete outlets for fuel charges, one outlet for each cylinder of the engine, and such outlets admit fuel charges into discrete cylinder heads.

It was also proposed to effect a thorough intermixing and agitation of exhaust gases by merging the passages for evacuation of exhaust gases from the combustion chambers of a multi-cylinder internal combustion engine. This was achieved by installing in the passages obstructions and by providing additional dead spaces in the channel which collects exhaust gases issuing from discrete combustion chambers. Such mode of collecting exhaust gases was intended to provide a longer reaction time for and to thus reduce the percentage of deleterious ingredients in exhaust gases.

OBJECTS OF THE INVENTION

An object of the invention is to provide an internal combustion engine with three or more cylinders which can operate quite satisfactorily without an intake manifold and without an exhaust manifold.

Another object of the invention is to provide a novel and improved cylinder head for an internal combustion engine with three or more cylinders.

A further object of the invention is to provide a novel and improved cover or hood for the cylinder head of the above outlined engine.

An additional object of the invention is to provide a novel and improved mounting for the turbocharger of an internal combustion engine.

Still another object of the invention is to enhance the efficiency of the turbocharger.

A further object of the invention is to provide a simple and compact engine and to construct and assemble the engine in such a way that it is less prone to excessive heating and is less likely to emit large quantities of heat beneath the hood of a motor vehicle than a conventional engine.

Another object of the invention is to provide a novel and improved method of conveying fuel charger to the inlet valves and for conveying exhaust gases from the exhaust valves of an internal combustion engine.

SUMMARY OF THE INVENTION

The invention is embodied in an internal combustion engine, particularly in a compressionignition engine. The improved engine has a cylinder block with at least three cylinders, and a cylinder head adjacent the block and having a combustion chamber for each cylinder, a single fuel charge admitting opening and a single exhaust opening for exhaust gases, first channels which connect the chambers with the single fuel charge admitting opening, and second channels which connect the chambers with the single exhaust opening.

Those surfaces of the cylinder head which surround the openings and the channels are preferably configurated and finished in such a way that they effect a substantially laminar flow of fuel (and more specifically a mixture of air and fuel) in the fuel charge admitting opening and first channels and a substantially laminar flow of exhaust gases in the second channels and in the exhaust opening.

The engine can further comprise a turbocharger which is connected with the single exhaust opening to be driven by exhaust gases and is further connected with the single fuel charge admitting opening to supply compressed fuel thereto. The turbocharger can be provided directly on the cylinder head; in accordance with a presently preferred embodiment, the turbocharger is installed in (and can form an integral part of) a cover or hood for the cylinder head. The cover can further contain a fuel charge cooler, and such cooler can constitute an integral part of the cover. The arrangement may be such that the turbocharger has an inlet which is directly connected with the exhaust opening and an outlet pipe for the fuel charge The outlet pipe is directly connected with the fuel charge admitting opening, and the fuel charge cooler can be installed in the pipe.

If the engine comprises means for injecting fuel into the fuel charge admitting opening, such injecting means can be installed in the cover and/or in the cylinder head, the same as the turbocharger and the cooler.

The novel features which are considered as characteristic of the invention are set forth in particular in the appended claims. The improved engine itself, however, both as to its construction and the mode of assembling the same, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
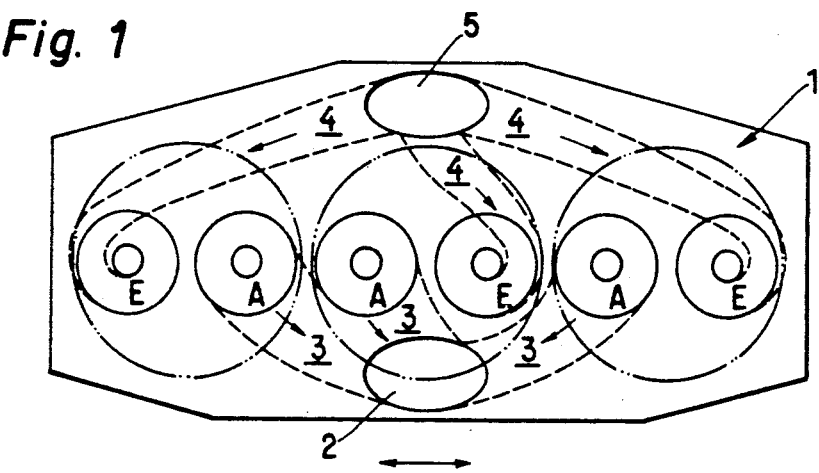
FIG. 1 is a schematic plan view of a cylinder head which can be used in the novel engine, namely in an engine having three cylinders.

FIG. 1 shows a cylinder head 1 which is mounted on a cylinder block 13 (FIG. 2) having at least three cylinders 14. In accordance with a feature of the invention, the cylinder head 1 has a single fuel charge admitting opening 5, a set of first channels 4 each of which conveys fuel (actually a mixture of fuel and oxygen) from the opening 5 to the inlet valve E for a discrete cylinder chamber in the cylinder head, a single exhaust opening 2, and a set of second channels 3 each of which connects the exhaust opening 2 with the exhaust valve A for a discrete combustion chamber. The openings 2, 5 and the channels 3, 4 are bounded by internal surfaces of the cylinder head 1, and these surfaces are configurated and finished (smoothed) for the purpose of ensuring substantially laminar flow of fuel from the opening 5, via channels 4 and into the combustion chambers of the cylinder head 1 as well as to effect a substantially laminar flow of exhaust gases from the combustion chambers via channels 3 and into the single exhaust opening 2. The channels 3, 4 are or can be straight or at least substantially straight.

Figure 2:
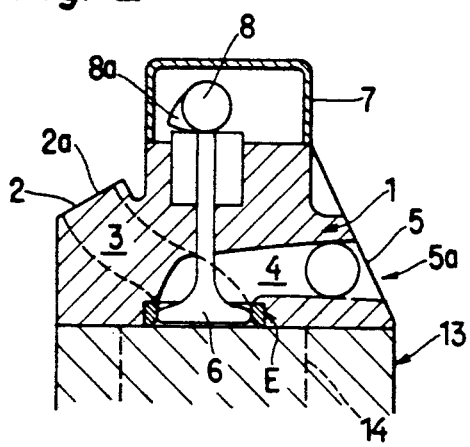
FIG. 2 is a fragmentary transverse sectional view of an engine having a modified cylinder head and a cover for the camshaft on the head.

FIG. 2 shows the cylinder block 13 for cylinders 14 and the cylinder head 1 in an aspirating engine. The reference character 6 denotes the valving element of one of the valves A and E. The illustrated valving element 6 forms part of one of the inlet valves E and serves to receive a fuel charge from the corresponding channel 4 which, in turn, receives a fuel charge from the opening 5. Each valving element is actuatable by a cam of a camshaft 8 which is mounted on the cylinder head 1 beneath a cover or hood 7. The camshaft 8 comprises, for each inlet valve E, a lobe 8a which ensures that the respective inlet valve opens before the piston in the respective cylinder reaches its top dead end center on the corresponding stroke. The arrow 5a indicates the direction of admission of fuel charge into the opening 5, and the arrow 2a indicates the direction of escape of exhaust gases from the opening 2. Thus, it is not necessary to employ an intake manifold and/or an exhaust manifold with attendant savings in material and space. Furthermore, the engine and the space beneath the hood are not unnecessarily heated and the likehihood of damage (such as cracks in the manifolds of conventional engines) is greatly reduced.

Figure 3:
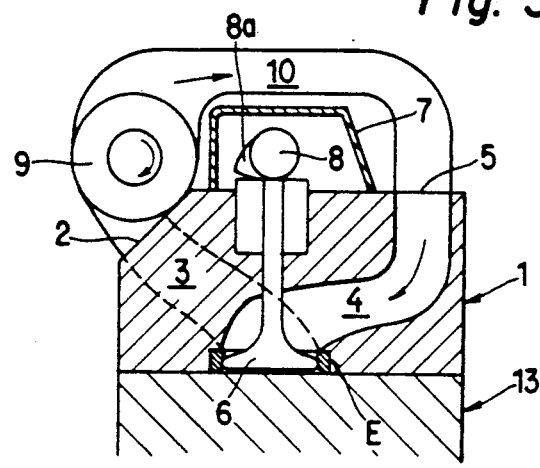
FIG. 3 is a similar fragmentary transverse sectional view of an engine having a different cylinder head and a turbocharger which is connected with the two openings of the cylinder head.

FIG. 3 illustrates a portion of an engine having a cylinder head 1 which is somewhat different from the cylinder head of FIG. 1 and carries a turbocharger 9 having an inlet directly connected to the exhaust opening 2 so that the turbocharger can be driven by exhaust gases. The outlet pipe or conduit 10 of the turbocharger 9 is directly connected with the fuel charge admitting opening 5 of the cylinder head 1. It will be seen that there is no need to provide a discrete conduit or pipe between the combustion chambers of the engine and the turbocharger 9 because the inlet of this turbocharger is directly connected to the single exhaust opening 2 of the cylinder head 1. The conduit or pipe 10 can be said to constitute a bridge between the main portion of the turbocharger 9 and the single fuel charge admitting opening 5.

Figure 4:
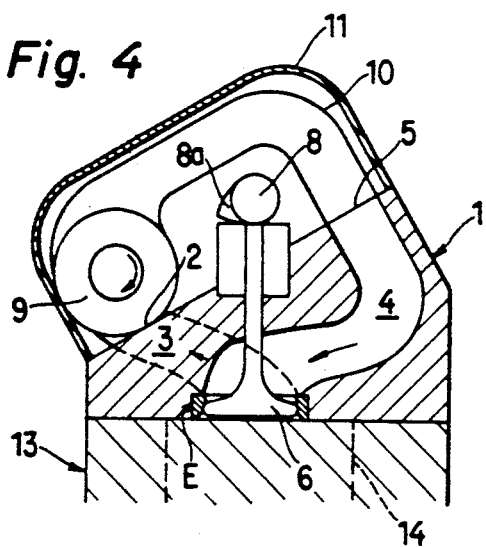
FIG. 4 is a fragmentary transverse sectional view of an engine which is similar to that of FIG. 3 except that the turbocharger is installed in a cover for the cylinder head.

Referring to FIG. 4, there is shown a portion of an engine which constitutes a modification of the engine of FIG. 3. The turbocharger 9 is installed in, and preferably forms an integral part of, a cover or hood 11 which overlies the cylinder head 1 and its openings 2, 5.

Figure 5:
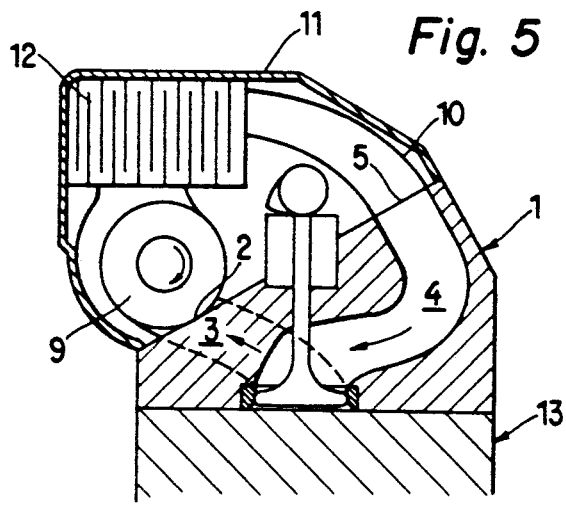
FIG. 5 is a fragmentary transverse sectional view of an engine which embodies the structure of FIG. 4 and a fuel charge cooler which is installed under the cover in the fuel charge conveying pipe of the turbocharger.

FIG. 5 shows a portion of an engine which is similar to that of FIG. 4 except that the pipe or conduit 10 contains a cooler 12 for fuel charge. Such cooler is installed within and can form an integral part of the cover or hood 11.

The exact construction of the turbocharger 9 and/or of the cooler 12 forms no part of the invention.

An important advantage of the improved engine is that it ensures a highly satisfactory admission of fuel charge into each combustion chamber of the cylinder head 1 as well as highly satisfactory evacuation of exhaust gases from the combustion chambers. This enhances the efficiency of the engine. A very high percentage of energy of exhaust gases can be used to effect the admission of fuel charge into the combustion chambers. In order to ensure a positive exchange of charges, energy which goes into the exhaust opening must contribute to the drawing of fresh air in such a way that one generates additional energy for piston work during the suction stroke.

The improved engine, and particularly its cylinder head 1, renders it possible to greatly shorten the path for the flow of fuel charge to the inlet valves E and for the flow of exhaust gases from the valves A to the opening 2. Shortening of the paths for exhaust gases from the exhaust valves A to the opening 2 renders it possible to enhance the efficiency of the turbocharger 9, i.e., a very high percentage of energy of exhaust gases is used in the turbocharger to deliver fuel charges to the inlet valves E. The establishment of very short paths between the exhaust valves A and the opening 2 entails a pronounced reduction of pressure- and temperature losses. Therefore, it is not necessary to alter the velocity of the charge from the supercharger to the inlet valves E and/or the velocity of exhaust gases from the exhaust valves A to the inlet of the supercharger 9. The improved cylinder head 1 does not have any unnecessary spaces which would cause a reduction of velocity with attendant rise in pressure prior to a renewed increase of velocity.

It has been found that omission of the intake manifold as well as of the exhaust manifold results in a pronounced reduction of energy losses. This is accomplished by the aforediscussed expedient of providing the cylinder head 1 with channels 4 which connect a single fuel charge admitting opening 5 with the combustion chambers of the cylinder head, and with channels 3 which connect the exhaust valves A with a single opening 2 for exhaust gases. In other words, the channels 3 merge in the interior of the cylinder head 1 not later than at the single opening 2, and the channels 4 merge in the cylinder head not later than at the single fuel charge admitting opening 5. This renders it possible to connect the inlet of the turbocharger 9 directly with the opening 2, i.e., without the interposition of one or more pipes as is customary in presently known engines, and the outlet pipe 10 of the turbocharger 9 can be connected directly with the opening 5 of the cylinder head 1. This not only greatly reduces the cost of the engine (because the two manifolds are no longer needed) but also reduces the likelihood of malfunction (such as can be caused by cracks which develop in the manifolds of heretofore known engines). Still further, it is possible to reduce the space requirement of the engine (which is devoid of manifolds), and the absence of an exhaust manifold entails a less pronounced heating of the engine and of the space beneath the hood.

As already explained above, the turbocharger 9 can be integrated into the cylinder head 1 and/or into the cover 11 for the cylinder head. Furthermore, and if the engine is provided with a fuel injection system, such system can be integrated into the cylinder head in a manner as disclosed, for example, in commonly owned copending patent application Ser. No. 07/110,288 filed Oct. 19, 1987 for "Cylinder head and hood therefor" to which reference may be had, if necessary. This, in combination with incorporation of the turbocharger 9 into the cylinder head 1 or into the cover 11 for the cylinder head, ensures that mixing of fuel for admission into the cylinder chambers can be carried out and completed in the cylinder head and that both energy components (air and fuel) are disposed in the cylinder head. Thus, one can dispense with various compromise solutions which involve the utilization of attachments and/or adapters with attendant energy losses.

The provision of a lobe 8a for each inlet valve E is desirable and advantageous because this promotes the flow of fuel-air mixture into the combustion chambers. The lobes 8a open the respective inlet valves E during the exhaust strokes of the respective pistons. Such selection of exhaust strokes ensures a more satisfactory flushing of combustion chambers and of the fuel admitting channels 4. The lobes 8a are particularly desirable in four stroke cycle engines with n times three cylinders wherein n is a whole number including one. In such engines, the exchange of gases takes place after each 240-degree turn of the crankshaft because energy impulses which are transmitted to the turbocharger immediately follow each other without any overlapping of opening times for exhaust valves. Continuous inflow of fuel into the combustion chambers of each three-cylinder group not only enhances the internal cooling of cylinders with fresh air but also ensures a highly desirable swirling of fuel charge.

It is desirable to place the exhaust valves A of each three-cylinder group as close to each other as possible in order to shorten the channels 3 between the valves A and the common opening 2. The connection between the turbocharger 9 and the single fuel charge admitting opening 5 is established by the pipe 10 which may contain the aforediscussed cooler 12.

The engine which embodies the present invention can be operated with a turbocharger or it can constitute an aspiration engine. An aspiration engine can also operate without manifolds (with attendant savings in space). Moreover, the kinetic energy of exhaust gases in the exhaust pipe reduces the gas exchange work regarding the inlet of the aspiration engine.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. An internal combustion engine, particularly a compression-ignition engine, comprising a cylinder block with at least three cylinders; and a cylinder head adjacent said block and having a chamber for each cylinder, a single charge admitting opening, first channels connecting said single opening with said chambers, a single exhaust opening for exhaust gases and second channels connecting said exhaust opening with said chambers.

2. The engine of claim 1, wherein said cylinder head has surfaces which surround said openings and said channels and are configurated and finished to effect a substantially laminar flow in said fuel charge admitting opening and said first channels and to effect a substantially laminar flow of exhaust gases in said exhaust opening and said second channels.

3. The engine of claim 1, further comprising a turbocharger connected with said single exhaust opening and with said single charge admitting opening.

4. The engine of claim 3, wherein said turbocharger is provided directly on said cylinder head.

5. The engine of claim 3, further comprising a cover for said cylinder head, said turbocharger being disposed in said cover.

6. The engine of claim 5, wherein said turbocharger is an integral part of said cover.

7. The engine of claim 1, further comprising a cover for said cylinder head and a fuel charge cooler in said cover.

8. The engine of claim 7, wherein said cooler is an integral part of said cover.

9. The engine of claim 7, further comprising a turbocharger in said cover, said turbocharger having an inlet directly connected with said exhaust opening and an outlet pipe for fuel charge directly connected with said charge admitting opening, said cooler being installed in said pipe.

10. The engine of claim 1, further comprising means for injecting fuel into said charge admitting opening, a cover for said cylinder head and a turbocharger connected with said openings, said turbocharger and said injecting means being disposed within said cover.

* * * * *